(12) United States Patent
Miron

(10) Patent No.: US 9,593,712 B2
(45) Date of Patent: *Mar. 14, 2017

(54) DETANGLING DEVICE, METHOD OF MAKING AND USING THE SAME

(71) Applicant: Nicholas Peter Okun Miron, Greenwich, CT (US)

(72) Inventor: Nicholas Peter Okun Miron, Greenwich, CT (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/531,331

(22) Filed: Nov. 3, 2014

(65) Prior Publication Data

US 2015/0047157 A1 Feb. 19, 2015

Related U.S. Application Data

(62) Division of application No. 13/183,332, filed on Jul. 14, 2011, now Pat. No. 8,875,353.

(51) Int. Cl.
*A45F 5/00* (2006.01)
*F16G 11/14* (2006.01)
*F16C 11/06* (2006.01)

(52) U.S. Cl.
CPC .............. *F16C 11/06* (2013.01); *F16G 11/14* (2013.01); *Y10T 24/1397* (2015.01); *Y10T 24/45723* (2015.01); *Y10T 29/49826* (2015.01); *Y10T 29/49947* (2015.01); *Y10T 29/49948* (2015.01); *Y10T 403/32* (2015.01); *Y10T 403/32631* (2015.01)

(58) Field of Classification Search
CPC ...... F16C 11/06; F16C 11/14; Y10T 24/1397; Y10T 24/45723; Y10T 403/32; Y10T 403/32631; Y10T 29/49826; Y10T 29/49947; Y10T 29/49948
USPC ................. 403/122, 291, 124; 119/792, 795; 24/3.13, 265 AL, 905–906, 3.1, 305, 24/115 A, 115 K, 115 H; 224/267, 255, 224/908, 930, 250, 251; 16/428, 110.1; 294/139, 158; 396/423

See application file for complete search history.

(56) References Cited

U.S. PATENT DOCUMENTS

| | | | |
|---|---|---|---|
| 1,826,887 A | 10/1931 | Kestenman | |
| 1,897,920 A * | 2/1933 | Wilson | F16G 11/00 152/242 |
| 2,554,184 A | 5/1951 | Gerstenblith | |
| 2,737,154 A | 3/1956 | Iwasaki | |
| 3,329,455 A * | 7/1967 | Becker | F16C 1/14 403/104 |
| 3,540,089 A * | 11/1970 | Franklin | A01K 27/005 119/776 |
| 3,851,979 A * | 12/1974 | Becker | F16L 3/14 248/62 |
| 4,045,911 A | 9/1977 | Ware | |
| 4,244,145 A | 1/1981 | Polacsek | |
| 4,312,260 A | 1/1982 | Morieras | |
| 4,445,866 A | 5/1984 | Cillieres | |

(Continued)

*Primary Examiner* — Jack W Lavinder
(74) *Attorney, Agent, or Firm* — McCarter & English, LLP; Danielle L. Herritt; Mei Bai

(57) ABSTRACT

Described herein are axially and radially swivelable detangling connector devices that are suitable for preventing entanglement, or detangling, of a device or means that is used to secure one or more mobile objects or subjects to one or more objects or subjects. Methods of making and using the disclosed devices are also provided herein.

6 Claims, 13 Drawing Sheets

(56) References Cited

U.S. PATENT DOCUMENTS

| | | | |
|---|---|---|---|
| 4,514,929 A | 5/1985 | Lestraden | |
| 4,944,074 A * | 7/1990 | Bullat | F16B 1/00 |
| | | | 24/602 |
| 5,361,726 A | 11/1994 | Harris et al. | |
| 5,450,820 A * | 9/1995 | Kirsch | A01K 27/005 |
| | | | 119/865 |
| 6,000,979 A | 12/1999 | Stewart | |
| 6,053,129 A | 4/2000 | Akre | |
| 6,231,205 B1 | 5/2001 | Slesinger et al. | |
| 6,250,256 B1 | 6/2001 | Lin | |
| 6,474,838 B2 | 11/2002 | Fang et al. | |
| 7,389,750 B1 | 6/2008 | Rogers et al. | |
| 7,467,604 B1 | 12/2008 | Werner et al. | |
| 7,559,715 B2 | 7/2009 | Germain et al. | |
| 7,637,230 B1 | 12/2009 | Eicks | |
| 7,726,887 B2 | 6/2010 | Su et al. | |
| 8,074,437 B2 | 12/2011 | Measom et al. | |
| 8,875,353 B2 | 11/2014 | Miron | |
| 2001/0047618 A1 | 12/2001 | Fang et al. | |
| 2003/0041812 A1 | 3/2003 | Lai | |
| 2004/0082263 A1 | 4/2004 | Parrish | |
| 2004/0264160 A1 | 12/2004 | Bienick | |
| 2006/0032460 A1 | 2/2006 | Hurwitz | |
| 2006/0032830 A1 | 2/2006 | Engel | |
| 2007/0119386 A1 | 5/2007 | Kung | |
| 2008/0043456 A1 | 2/2008 | Bernardini et al. | |
| 2008/0216769 A1 | 9/2008 | LaCross | |
| 2010/0251971 A1 | 10/2010 | Hsieh | |
| 2010/0258061 A1 | 10/2010 | Miron | |
| 2012/0042837 A1 | 2/2012 | Vandenbulcke | |

\* cited by examiner

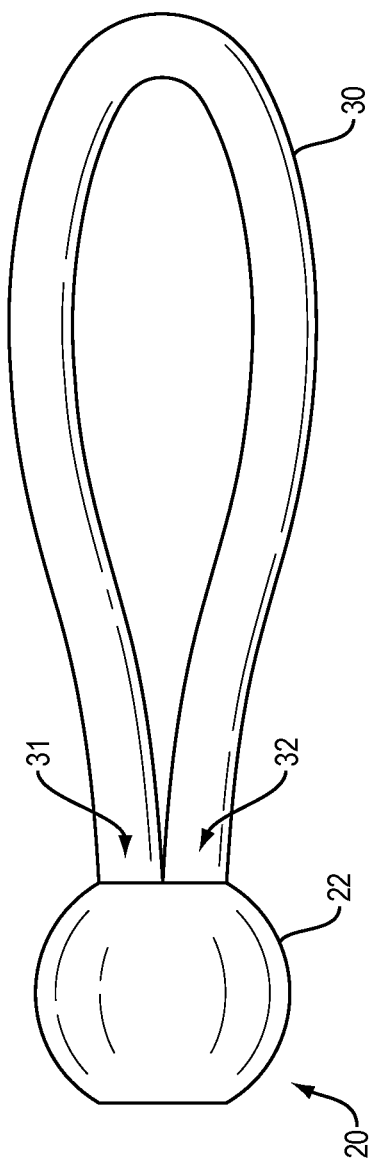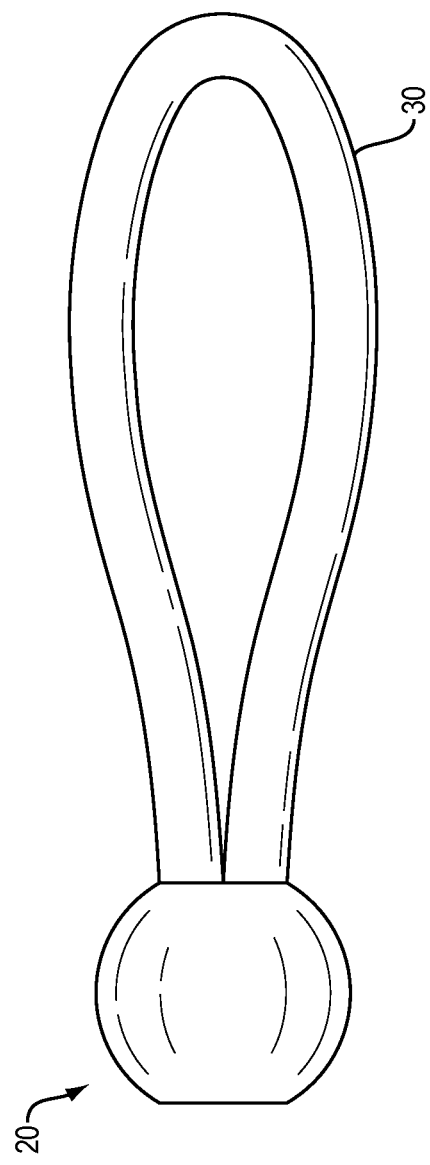

DETANGLING DEVICE, METHOD OF MAKING AND USING THE SAME

RELATED APPLICATION INFORMATION

This application is a divisional of U.S. patent application Ser. No. 13/183,332, filed Jul. 14, 2011, now U.S. Pat. No. 8,875,353, the contents of which are herein incorporated by reference.

TECHNICAL FIELD

The present disclosure is generally related to connector devices that are suitable for preventing the entanglement of other devices or means used to secure or restrain a mobile object or subject.

BACKGROUND

In many commercial and domestic settings, it is necessary to secure a mobile object or subject to another object or subject. For example it may be necessary to secure a boat to a dock or secure a pet to an owner, etc. In many such circumstances, the means of securing one object or subject to another involves a device (i.e., rope, leash, wires, etc.) that, through the motion of the object or subject being controlled, becomes entangled. Entanglement limits the control over the object or subject and may be harmful to the object or subject being controlled or the object or subject to which it is anchored. Leashes, for example, are commonly used to provide an owner with the ability to control or restrain a pet while still allowing a sufficient degree of freedom of movement for the pet and the owner. Such desired balance may be thwarted by the entanglement of the leash. A similar balance may be desired in many other commercial or domestic applications where entanglement would be problematic.

BRIEF SUMMARY

In a first aspect, the present invention is directed to a detangling connector device that is suitable for preventing entanglement of, or for detangling, a means used for restraining a mobile object or subject.

In a first embodiment an axially and radially swivelable detangling connector device is provided. The device comprises a detangling connector which comprises a distal end and a proximal end defining at least one proximal opening extending from the proximal end towards the distal end. The device further comprises a looped connector having at least two ends where the two ends are housed and secured within the at least one proximal opening defined by the proximal end of the detangling connector such that a loop is formed adjacent to the proximal end of the detangling connector. The device further comprises an endcap defining a first opening for receiving and housing the distal end of the detangling connector such that the detangling connector is radially and axially swivelable within the detangling connector.

In another embodiment, the detangling connector further comprises at least one distal opening defined by the distal end that extends from the distal end towards the proximal end. and a common conduit connecting the at least one distal opening in the distal end with the at least one proximal opening in the proximal end.

In another embodiment, the detangling connector includes at least one distal opening defined by the distal end, at least two proximal openings defined by the proximal end, and a common conduit connecting the distal opening with the proximal openings such that the ends of the looped connector are housed and secured within the distal and proximal openings of the detangling connector.

In another embodiment, the detangling connector includes at least two distal openings defined by the distal end, at least two proximal openings defined by the proximal end and a common conduit connecting the distal opening with the proximal openings such that the ends of the looped connector are housed and secured within the distal and proximal openings of the detangling connector.

In another embodiment, the diameter of the at least one distal opening in the distal end of the detangling connector is larger than the diameter of the at least one proximal opening in the proximal end of the detangling connector.

In another embodiment, the ends of the looped connector are secured within the openings defined by the detangling connector by reducing the diameter of at least one opening around the ends of the looped connector.

In another embodiment, the ends of the looped connector are affixed either individually or in combination, with a cable stop such that the loose ends of the looped connector may not be pulled through the openings in the proximal end of the detangling connector.

In another embodiment, the detangling connector includes male and female pin-snaps for securing the detangling connector around the ends of the looped connector.

In another embodiment, the detangling connector comprises aluminum, steel, plastic or any combination thereof.

In another embodiment, the detangling connector is a spheroidally shaped connector.

In another embodiment, the endcap further includes a handle or a second opening defined by the endcap for receiving and securing an end portion of an entangleable connector.

In another embodiment, an axially and radially swivelable detangling connector device is provided. The device comprises a spheroidally shaped connector. The device also comprises two proximal openings defined by the proximal end of the spheroidally shaped connector and extending towards a distal end of the spheroidally shaped connector. The device also comprises two distal openings defined by the distal end of the spheroidally shaped connector and extending towards the proximal end of the spheroidally shaped connector. The device further comprises a common conduit connecting the distal and proximal openings. The device also comprises a looped connector having two ends, the two ends being housed and secured within the proximal and distal openings of the spheroidally shaped connector such that a loop is formed adjacent to the proximal end of the spheroidally shaped connector. The device also comprises an endcap which itself comprises a first opening for receiving and housing a distal end of the spheroidally shaped connector. The endcap also comprises a handle or a second opening defined by the endcap for receiving and securing an end portion of a leash.

In a second aspect, the present invention is further directed to a method of preparing a detangling connector device that is suitable for preventing entanglement of, or for detangling, a means used for restraining a mobile object or subject.

In a first embodiment, a method of preparing an axially and radially swivelable detangling connector device is provided. The method comprises the step of providing a detangling connector having distal openings defined by a distal end of the detangling connector, proximal openings defined by a proximal end of the detangling connector and a common conduit connecting the proximal and distal openings. The method also comprises providing a looped connector having at least to ends, and inserting the at least two ends of the looped connector into the proximal openings such that a loop is formed adjacent to the proximal end of the detangling connector. The method also comprises the step of applying a fastening means to the detangling connector such that the ends of the looped connector are housed and secured within the detangling connector.

In another embodiment, the fastening means comprises reducing the diameter of the openings, defined by the detangling connector, around the ends of the looped connector.

In another embodiment, the fastening means comprises interlocking male and female pin-snaps for securing the ends of the looped connector into the openings defined by the detangling connector.

In another embodiment, the step of providing the detangling connector having openings comprises forming the detangling connector and the openings defined by the detangling connector by injection molding.

In another embodiment, the step providing the detangling connector having openings comprises forming the detangling connector by injection molding and forming the openings defined by the detangling connector by drilling.

In another embodiment, the method further comprises the step of securing and housing the distal end of the detangling connector into a first opening defined by the endcap.

In a third aspect, the present invention is directed to a method of using a detangling connector device, as disclosed herein to prevent entanglement of, or to detangle, a means used for restraining a mobile object or subject.

In a first embodiment, a method of using a detangling connector device is provided. The method comprises connecting the looped connector of the detangling connector device to a means of securing or controlling an object or subject such and securing the endcap to an entangleable connector such that entanglement of said entangleable connector is prevented or corrected.

In another embodiment, the means of securing or controlling an object or subject is a dog collar. In other embodiments, the entangleable connector is a dog leash.

BRIEF DESCRIPTION OF THE DRAWINGS

The foregoing and other aspects, embodiments, objects, features and advantages of the invention can be more fully understood from the following description in conjunction with the accompanying figures. The figures and the following description of the figures are meant only to illustrate and in no way limits the claimed invention.

FIG. 4 is a side view of a looped connector whose two loose ends are housed in the openings of a detangling connector.

FIG. 5 is a side view of a looped connector whose two loose ends are housed and secured, by the reduction of the detangling connector's diameter, in the openings of the detangling connector.

DETAILED DESCRIPTION

Device

Figure 1:
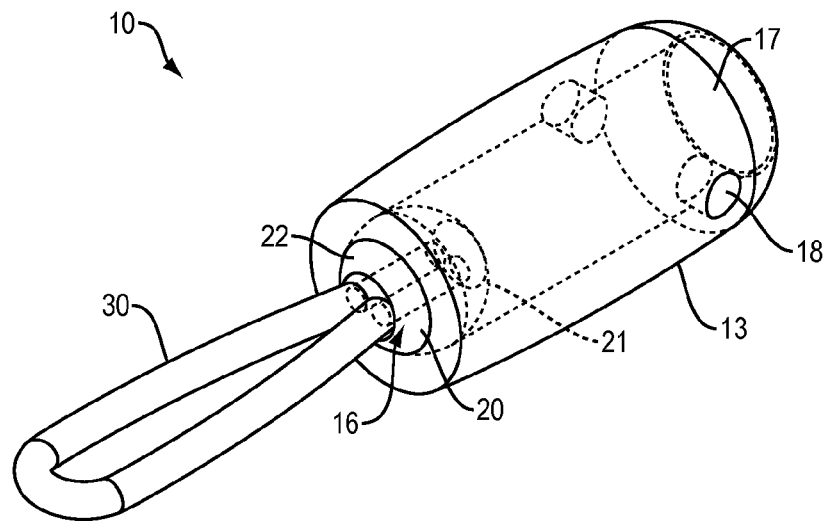
FIG. 1 is an isometric view of an axially and radially swivelable detangling connector device.

The present invention provides connector devices and methods of making and using the same. The devices, which are axially and radially swivelable detangling connector devices, include a detangling connector, a looped connector and an endcap. FIG. 1 depicts a device that is exemplary of the devices contemplated herein. In FIG. 1, a radially and axially swivelable detangling connector device 10 is depicted. The device 10, generally, includes a looped connector 30, a detangling connector 20 and an endcap 13. The detangling connector 20, includes a distal end 21 and a proximal end 22. The endcap 13 includes a first opening 16 and a second opening 17.

The first opening 16 of the endcap 13 is fashioned to house and secure at least a distal end 21 of the detangling connector 20. In certain embodiments, the endcap may be comprised of any metal or plastic material. One of ordinary skill in the art will be able to determine the material most suitable for the desired application. For example, the endcap 13 may be comprised of aluminum, steel, plastic or any combination thereof. In certain embodiments, the first opening 16 of the endcap 13 is formed of a rigid material the houses and secures the detangling connector 20 such that the detangling connector may swivel in an axial or radial direction. In other embodiments, the first opening 16 is formed by a less rigid and more malleable material such that the detangling connector 20 may radially swivel and may also axially swivel by deforming the material which forms the first opening 16.

The second opening 17 of the endcap 13 is fashioned to house and secure an end portion of connector that may become tangled. For example, the second opening 17 of endcap 13 may be fashioned to house and secure an end portion of an entangleable connector such as a leash, rope, wire, or any other material that may be used to secure one object or subject to another. One of ordinary skill in the art would be able to determine which entangleable connector is suitable for a desired application. The entangleable connector, in some embodiments, is housed in the second opening 17 of the endcap 13 by simply inserting an end portion of the entangleable connector within the second opening 17. The entangleable connector, in some embodiments, is secured within the second opening 17 of the endcap 13 by a fastening means 18. The fastening means may for instance include a bolt, screw, pin or other mechanism by which an end portion of an entangleable connector may be held in place within the second opening 17 as desired such that when a force is applied by a mobile object or subject or by the object or subject to which such mobile object or subject is anchored, the entangleable connector will not dislodge. The present invention further contemplates other means by which the entangleable connector may be housed and secured within the second opening 17 of the endcap 13.

The detangling connector 20, or a distal end 21 thereof, is housed and secured within the first opening 16 of the endcap 13 such that it is axially and radially swivelable. The detangling connector 20, in certain embodiments, comprises a plastic or metal and may for instance be aluminum, steel, plastic or any combination thereof. One of ordinary skill in the art would be able to determine a material of suitable composition for a desired application. The present invention therefore contemplates and includes such desired materials or combinations.

Figure 2:
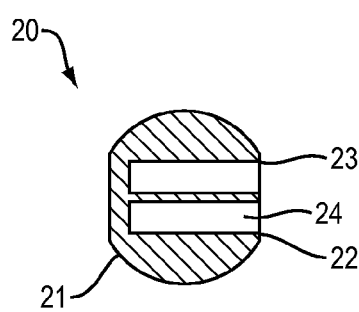
FIG. 2 is a side view of a detangling connector with two proximal openings in the proximal end that extend towards the distal end of the detangling connector.

The detangling connector 20, in some embodiments, is a ball joint. For example, the detangling connector 20 is circular or in the shape of a ball. These shapes allow the detangling connector 20 to swivel axially and radially while being housed within the first opening 16 of the endcap 13. In other embodiments, the detangling connector may be cylindrical. In such embodiments where the detangling connector 20 is cylindrical in shape, it is preferable that the first opening 16 is formed of a malleable material such that the detangling connector 20 may not only swivel radially, but also swivel axially by deforming the malleable material. FIG. 2 depicts other embodiments in which the detangling connector 20 is both cylindrical and spherical. For example, at least one of the distal end 21 and proximal end 22 of the detangling connector 20 may be flat while the portion of the detangling connector 20 between the distal end 21 and proximal end 22 is spherical in that it has a wider diameter than the flat portion 23. While it is preferable to have circular, cylindrical or spherical and cylindrical detangling connector, the present invention also contemplates and includes other shapes which may facilitate both the axial and radial swiveling of the detangling connector 20.

The detangling connector 20 also includes at least one proximal opening 24 in the proximal end 22. The at least one proximal opening 24 is formed such that the looped connector 30 may be housed and secured therein.

It is contemplated that the present invention includes looped connectors having two or more loose ends. As such, it is also contemplated that the detangling connector 20 will also include 1, 2, 3, 4, 5, 6, 7, 8, 9, 10 or more openings in the detangling connector for housing and securing the loose ends of the looped connector to the detangling connector to form a loop from the looped connector adjacent to a proximal end of the detangling connector. The number of distal openings in the distal end of the detangling connector may be more than, less than or the same as the number of proximal openings in the proximal end of the detangling connector. For instance, the detangling connector may have two distal openings in the distal end and a single proximal opening in the proximal end. The detangling connector may have two distal openings in the distal end and two proximal openings in the proximal end. The detangling connector may have one distal opening in the distal end and two proximal openings in the proximal end. The detangling connector may have one distal opening in the distal end and one proximal opening in the proximal end. In some embodiments the detangling connector only has proximal opening in the proximal end that extend toward the distal end and have zero distal openings in the distal end. The present invention therefore includes embodiments wherein the looped connector has a number of loose ends that corresponds to the number of openings in the detangling connector.

Figure 3:
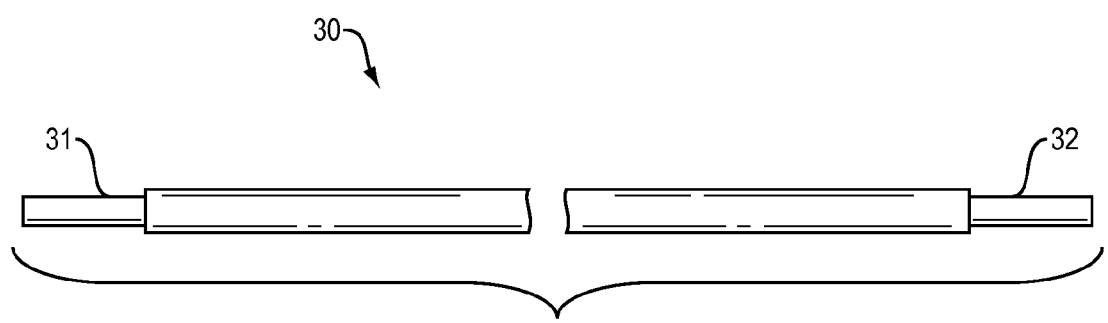
FIG. 3 is a side view of a looped connector having two loose ends.

FIG. 3 depicts a looped connector 30 having at least two loose ends 31, 32. The loose ends 31, 32 are inserted into the at least one proximal opening 24 of the detangling connector 20 such that a loop is formed, from the looped connector 30, adjacent to the proximal end 22 of the detangling connector 20. FIG. 1 depicts looped connector 30 as it forms a loop adjacent to the proximal end 22 of the detangling connector 20. The looped connector 30 may be formed of a flexible material that allows the loose ends 31, 32 to be secured to a detangling connector 20 as depicted in FIG. 1. FIG. 3 depicts looped connector 30 which may, for example, be formed of wire cables, PU coated wire cables, polyurethane rope, rubber, or composites of any of these.

FIG. 4 depicts a looped connector 30 that is secured to the detangling connector 20 such that a loop is formed adjacent to the proximal end 22 of the detangling connector 20. The looped connector 30 is secured to the detangling connector 20 by housing and securing the loose ends 32, 32 of the looped connector 30 into at least one proximal opening 24 of the detangling connector 20. To house the loose ends 31, 32, they are simply inserted into the proximal opening(s) 24 in the proximal end 22 of the detangling connector 20. To secure the loose ends 31, 32 of the looped connector into the proximal opening(s) 24 of the detangling connector, a fastening means may be applied to the detangling connector. In some embodiments, the fastening means includes reducing the diameter of the proximal opening(s) 24 around the loose ends 31, 32 such that they are secured around the loose ends 31, 32. FIG. 5 depicts the contrast to FIG. 4, wherein the diameter of the detangling connector is reduced from about 12.0 to about 11.8. The diameter of the detangling connector 20 or the diameter of the proximal opening(s) 24 may be reduced or both. It is contemplated and included within the present invention that other diameters may be applied both before and after inserting the loose ends 31, 32 of the looped connector 30 into the proximal opening(s) 24 of the detangling connector.

Figure 6B:
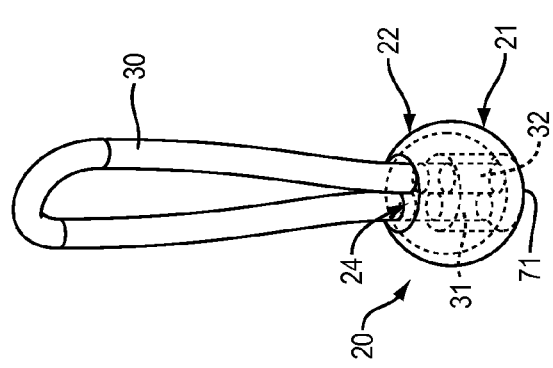
FIG. 6B is an isometric view of a detangling connector having two distal openings in the distal end and two proximal openings in the proximal end, wherein the distal openings in the distal end have a wider diameter than the proximal openings in the proximal end.
Figure 6D:
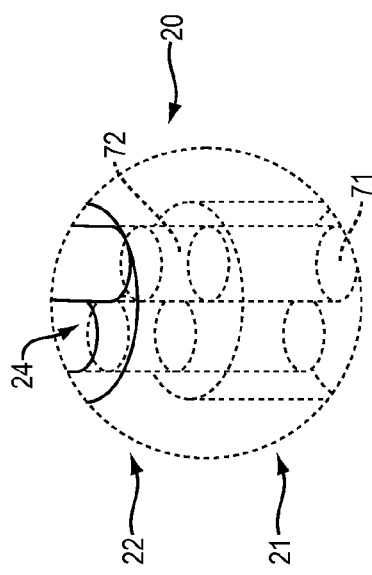
FIG. 6D is an isometric view of a looped connector secured to a detangling connector using individual cable stops on each loose end of the looped connector.
Figure 6A:
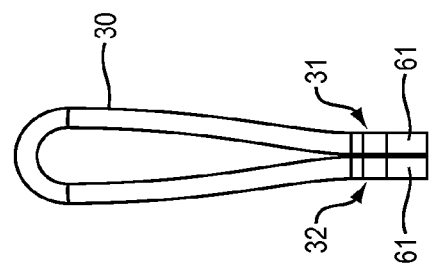
FIG. 6A is a side view of a looped connector wherein the loose ends are individually affixed to a cable stop.

In some embodiments, the looped connector may be secured to the detangling connector by means other than reduction of the diameter of the detangling connector or reduction of the diameter of the proximal opening(s). In some embodiments, the fastening means for securing the looped connector to the detangling connector includes at least one cable stop affixed to the loose ends of the looped connector 30. FIG. 6A provides an exemplary embodiment wherein the loose ends 31, 32 of the looped connector 30 are separately affixed with cable stops 61. FIG. 6B depicts an exemplary embodiment wherein the detangling connector 20 includes two proximal openings 24 in the proximal end 22 of the detangling connector and two distal openings 71 in the distal end 21 of the detangling connector 20. The proximal openings 24 in the proximal end 22 extend from the proximal end 22 towards the distal end 21. The distal openings in the distal end 21 extend from the distal end 21 towards the proximal end 22. At least one common conduit 72 is formed between proximal openings 24 and 71. In some embodiments the looped connector 30 is secured to the detangling connector by a fastening means such as cable stop 61 of FIG. 6A. In some embodiments, the loose ends 31, 32 of the looped connector 30 are individually inserted into the proximal openings 24 of the detangling connector 20 and passes through the common conduit 72 to the distal openings 71 in the distal end 21 of the detangling connector 20. A cable stop 61 is affixed to the loose ends 31, 32 such that the loose ends cannot be dragged through the proximal openings 24 in the proximal end 22 of the detangling connector 20. The cable stop 61 creates a diameter around the loose ends 31, 32 that is larger than the diameter of the proximal opening 24 in the proximal end 22, but smaller than the diameter of the distal opening 71 in the distal end 21. In some embodiments, the diameter of the distal openings 71 in the distal end 21 are wider than the diameter of the proximal openings 24 in the proximal end 22 such that an affixed cable stop 61 secures the loose ends 31, 32 in the detangling connector 20 by preventing the loose ends 31, 32 of the looped connector 30 from being able to move from the distal end 21 to the proximal end 22.

Figure 6C:
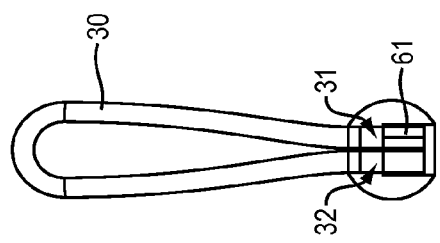
FIG. 6C is a side view of a looped connector secured to a detangling connector using individual cable stops on each loose end of the looped connector.
Figure 7A:
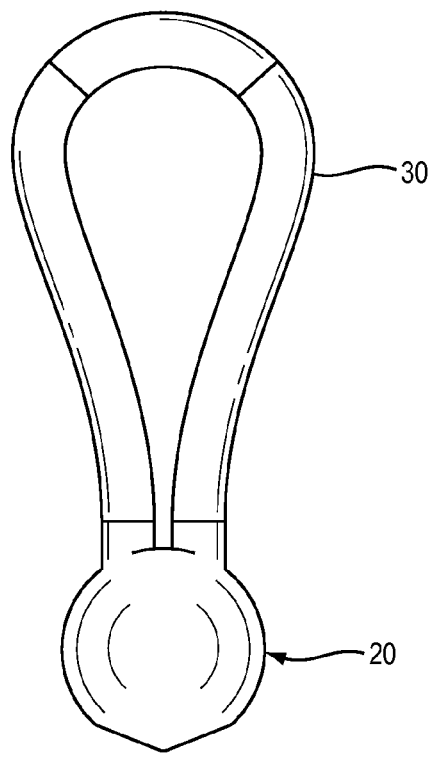
FIG. 7A is a side view of a looped connector secured to a detangling connector.
Figure 7B:
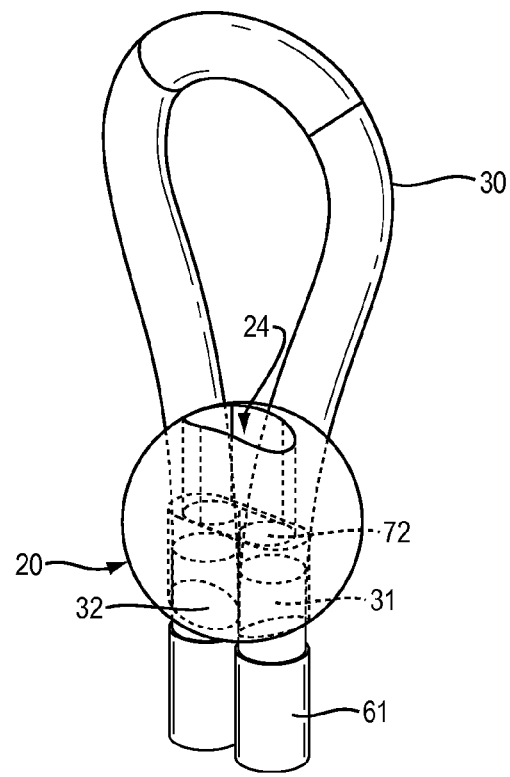
FIG. 7B is an isometric view of the loose ends of a looped connector being housed in the openings of a detangling connector.
Figure 7C:
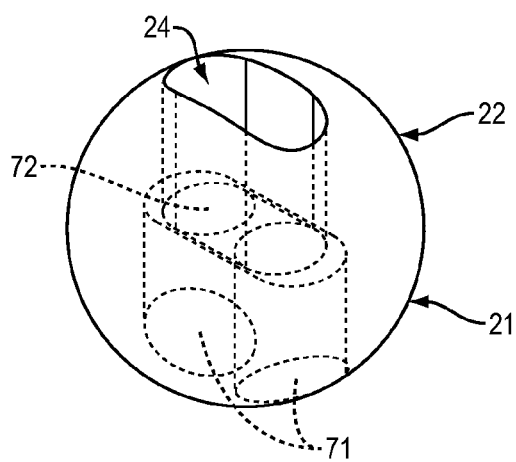
FIG. 7C is an isometric view of a detangling connector having a single proximal opening in the proximal end and two distal openings in the distal end.
Figure 7D:
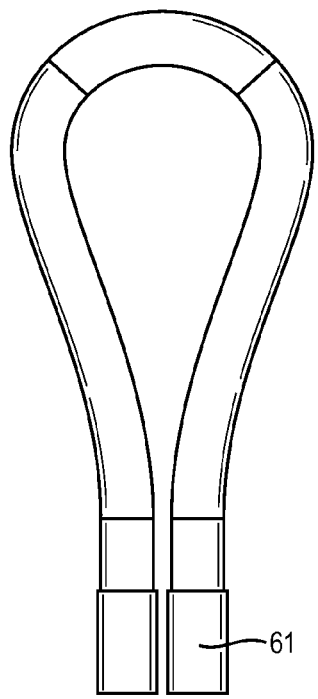
FIG. 7D is a side view of a looped connecter having each loose end individually affixed to a cable stop.
Figure 8C:
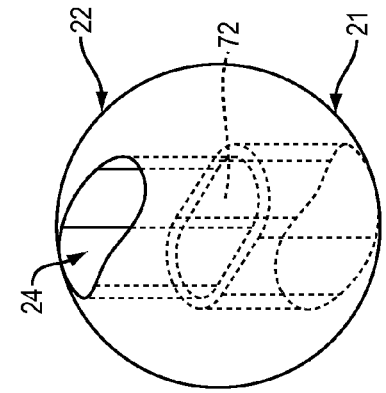
FIG. 8C is an isometric view of a detangling connector having a single proximal opening in the proximal end and a single, wider distal opening in the distal end.
Figure 8F:
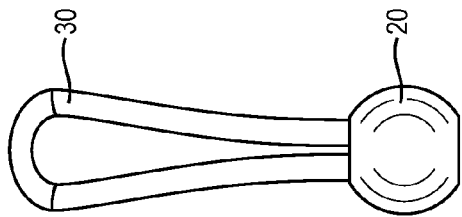
FIG. 8F is an isometric view of the loose ends of a looped connector being housed and secured within the single proximal opening in the proximal end of a detangling connector.
Figure 8B:
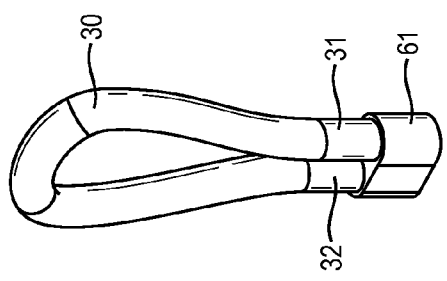
FIG. 8B is an isometric view of the loose ends of a looped connector being combined by a single cable stop.
Figure 8E:
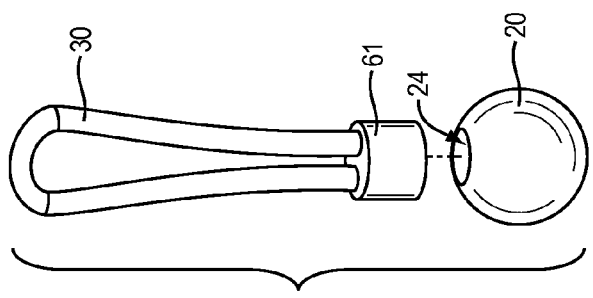
FIG. 8E is an isometric exploded view of a detangling connector having a single proximal opening in the proximal end and a looped connector having a combined cable stop affixed to the loose ends.
Figure 8A:
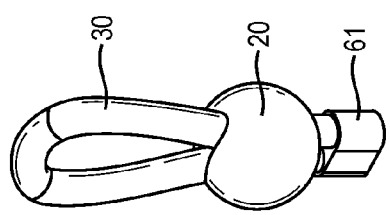
FIG. 8A is an isometric view of the loose ends of a looped connector housed within a single proximal opening of a detangling connector having a single distal opening in the distal end and a single proximal opening in the proximal end.
Figure 8D:
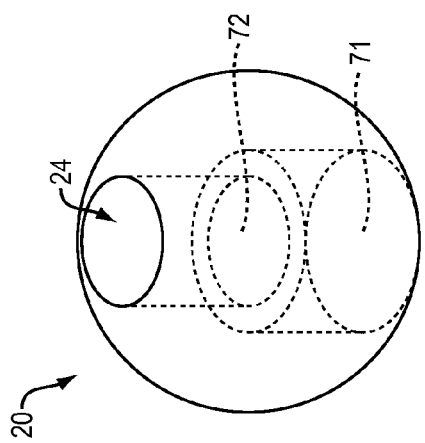
FIG. 8D is an isometric view of a detangling connector having a single proximal opening in the proximal end and a single, wider distal opening in the distal end.

FIG. 6C depicts an embodiment wherein the fastening means is a single cable stop 61 that is affixed to both loose ends 31, 32 of the looped connector 30. FIG. 6D depicts an embodiment wherein the detangling connector 20 includes two proximal openings 24 in the proximal end 22 and a single distal opening 71 in the distal end 21. The diameter of the distal opening 71 in the distal end 21 is bigger than the diameter of the proximal opening 24 in the proximal end 22. The cable stop 61 creates a diameter around the loose ends 31, 32 that is larger than the diameter of the proximal opening 24 in the proximal end 22, but smaller than the diameter of the distal opening 71 in the distal end 21. The looped connector 30 is secured to the detangling connector 20 by housing the loose ends 31, 31 in the proximal openings 24, 71 of the detangling connector 20 and by affixing a single cable stop 61 to both loose ends 31, 32 in combination. The smaller diameter of the proximal openings in the proximal end 22 and the cable stop 61 prevents the loose ends 31, 32 from being drawn through the distal opening 71 towards the proximal end 22 of the detangling connector 20.

FIGS. 7A-7D depict embodiments wherein the detangling connector 20 includes a single proximal opening 24 in the proximal end 22, two distal openings 71 in the distal end and conduit(s) 72 connecting proximal opening 24 and distal openings 71. The diameter of distal opening 71 is larger than the diameter of proximal opening 24. The fastening means is a cable stop 61. A cable stop 61 is individually and separately affixed to each loose end 31, 32 of the looped connector 30 such that the loose ends 31, 32 can be pulled into the distal openings 71 but cannot be pulled through the proximal opening 24.

FIGS. 8A-8F depict embodiments wherein the detangling connector 20 includes a single proximal opening 24 in the proximal end 22, a single distal opening 71 in the distal end 21 and conduit(s) 72 connecting the proximal opening 24 and the distal opening 71. The diameter of distal opening 71 is larger than the diameter of proximal opening 24. The fastening means is a cable stop 61. A cable stop 61 is affixed to both loose ends 31, 32, in combination, of the looped connector 30 such that the loose ends 31, 32 can be pulled into the distal openings 71 but cannot be pulled through the proximal opening 24.

Figure 9A:
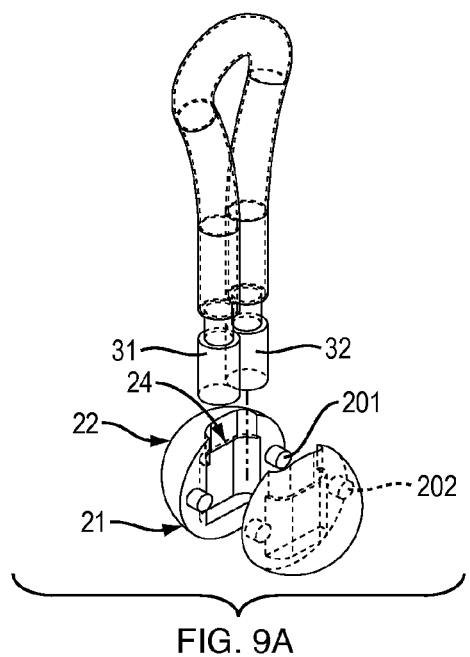
FIG. 9A is an isometric exploded view of a detangling connector having male and female pin-snaps for securing the detangling connector around the loose ends of a looped connector.
Figure 9B:
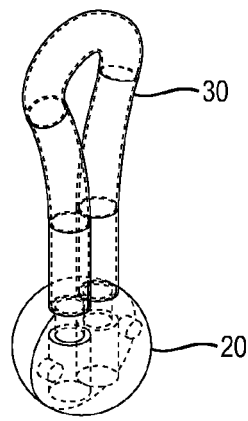
FIG. 9B is an isometric view of a detangling connector housing the loose ends of a looped connector and securing the loose ends by interlocking male and female pin-snaps.
Figure 9C:
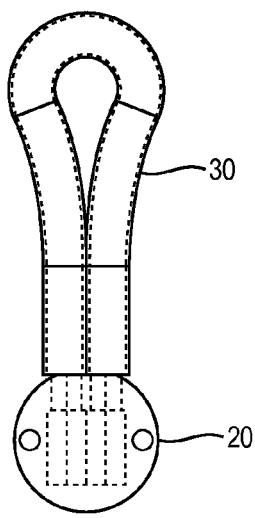
FIG. 9C is a side view of a detangling connector housing the loose ends of a looped connector and securing the loose ends by interlocking male and female pin-snaps.
Figure 10A:
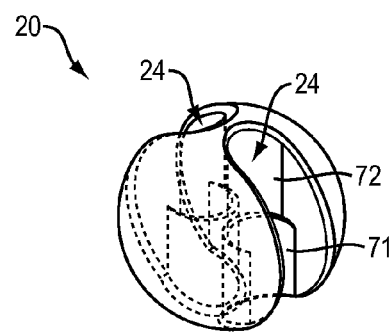
FIG. 10A is an isometric view of a detangling connector having distal openings in a distal end of the detangling connector that extends to the proximal end without forming an enclosed conduit.
Figure 10B:
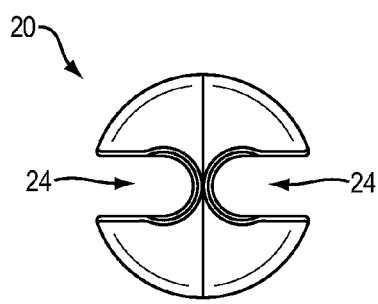
FIG. 10B is a top-view of a detangling connector having distal openings in a distal end of the detangling connector that extends to the proximal end without forming an enclosed conduit.
Figure 10C:
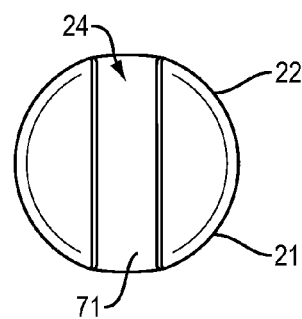
FIG. 10C is a side right-view of a detangling connector having distal openings in a distal end of the detangling connector that extends to the proximal end without forming an enclosed conduit.
Figure 10D:
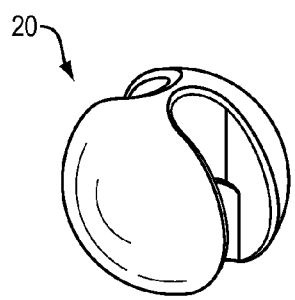
FIG. 10D is a isometric view of a detangling connector having distal openings in a distal end of the detangling connector that extends to the proximal end without forming an enclosed conduit.

FIGS. 9A-9C depict embodiments wherein the looped connector 30 is secured to the detangling connector 20 by a fastening means which includes interlockable male 201 and female 202 pin-snaps. The detangling connector 20 includes two proximal openings 24 in the proximal end 22 that extends towards the distal end 21. FIG. 9A depicts an exploded view of the detangling connector 20 wherein the male 201 and female 202 pin-snaps are depicted. The loose ends 31, 32 of the looped connector 30 are housed in the proximal openings 24 of the detangling connector 20 and are secured therein by interlocking the male 201 and female 202 pin-snaps such that the loose ends 31, 32 is held in place inside the detangling connector as depicted in FIG. 9B and 9C.

FIGS. 10A-10D depict another embodiment of the detangling connector 20. The detangling connector includes two distal openings 71 in the distal end 21 and two proximal openings 24 in the proximal end 22. The distal openings 71 in the distal end 21 extends toward the proximal end 22. The proximal openings 24 in the proximal end 22 extends toward the distal end 21. Common conduit(s) 72 connect proximal openings 24 and distal openings 71. Unlike previously described embodiments, the conduit(s) 72 in the present embodiment are only partially enclosed. As such the fastening means could include simply snapping the loose ends 31, 32 of the looped connector 30 into the openings 24, 71 and conduit(s) 72. In some embodiments, the diameter of the distal openings 71 is wider than the diameter of the proximal openings 24. In some embodiments, the loose ends 31, 32 are affixed, either separately or in combination, with cable stops such that they may be housed in the distal openings 71 in the distal end 21 but could not be pulled through proximal openings 24 in the proximal end 22.

In some embodiments, the fastening means is a combination of any of the fastening means described herein. For example the fastening means may include glues or other adhesives, pin-snaps, cable stops, reducing the diameter of the detangling connector or the diameter of the openings in the detangling connector. Other fastening means are also contemplated and are included in the present invention. Such additional fastening means may be individually, or in combination, applied to the axially and radially swivelable detangling connector devices of the present invention.

Figure 11A:
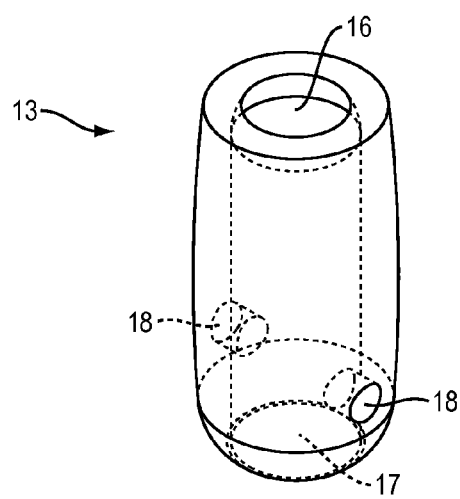
FIG. 11A is an isometric view of an endcap having a first opening and a second opening.
Figure 11B:
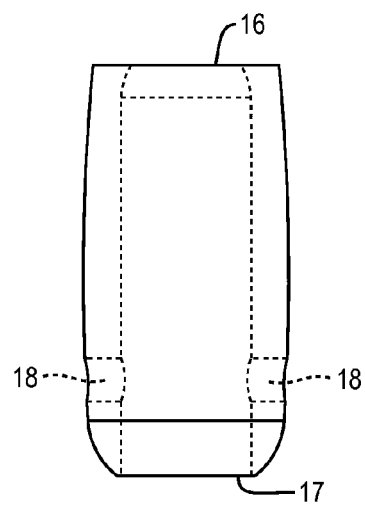
FIG. 11B is an side view of an endcap having a first opening and a second opening.
Figure 11C:
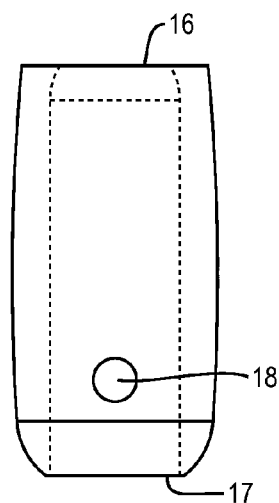
FIG. 11C is an side view of an endcap having a first opening and a second opening.

FIGS. 11A-11C depict three separate views of the endcap 13 and exemplary dimensions thereof. The depicted endcap 13 provides an embodiment wherein the endcap includes a first opening 16 and a second opening 17. In the present invention, opening 16 is used to house and secure a detangling connector. Opening 17 is used to house and secure an entangleable connector. Opening 17 includes a fastening means 18 for securing the entangleable connector to the endcap.

Figure 12A:
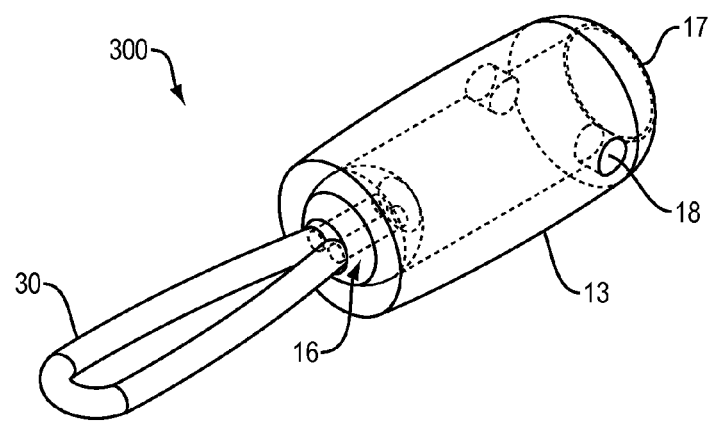
FIG. 12A is an isometric view of a looped connector secured to a detangling connector that is itself housed and secured within a first opening of an endcap.
Figure 12B:
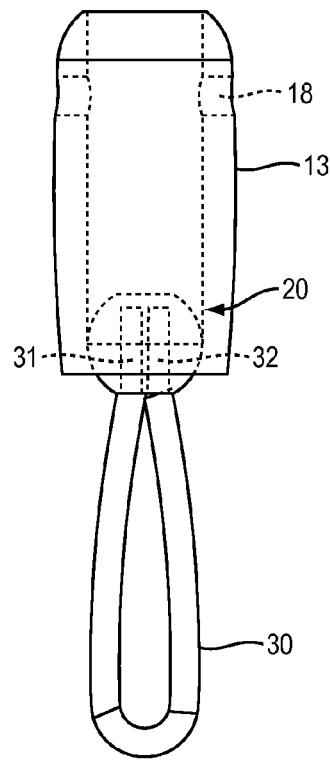
FIG. 12B is an side view of a looped connector secured to a detangling connector that is itself housed and secured within a first opening of an endcap.
Figure 12C:
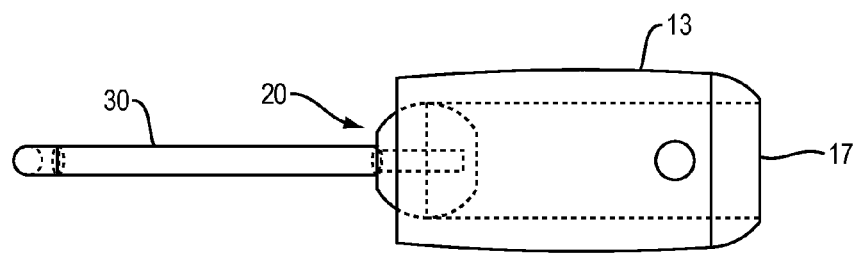
FIG. 12C is an side right-view of a looped connector secured to a detangling connector that is itself housed and secured within a first opening of an endcap.

FIGS. 12A-12C depict three separate views of an embodiment of the axially and radially swivelable detangling connector device and exemplary dimensions thereof. The depicted device 300 provides an embodiment wherein the endcap 13 includes a first opening 16 and a second opening 17. In the present invention, opening 16 is used to house and secure a detangling connector 20. Opening 17 is used to house and secure an entangleable connector. Opening 17 includes a fastening means for securing the entangleable connector to the endcap.

Figure 13A:
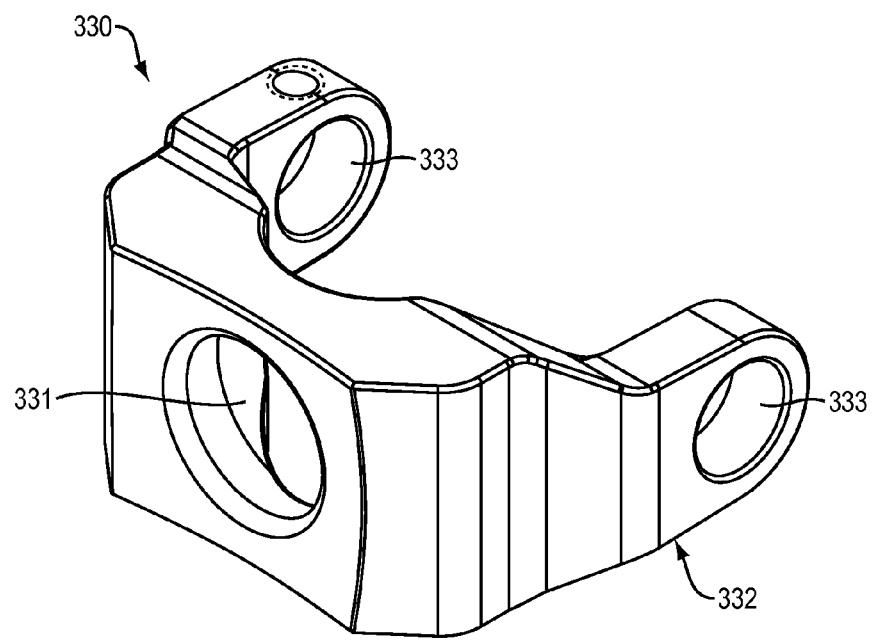
FIG. 13A is a isometric view of an endcap having a first opening in a first portion and a handle portion opposite the first portion.
Figure 13B:
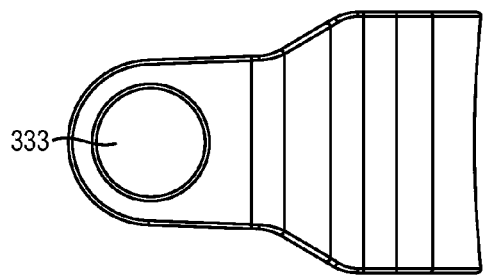
FIG. 13B is a side right-view of an endcap having a first opening in a first portion and a handle portion opposite the first portion.
Figure 13C:
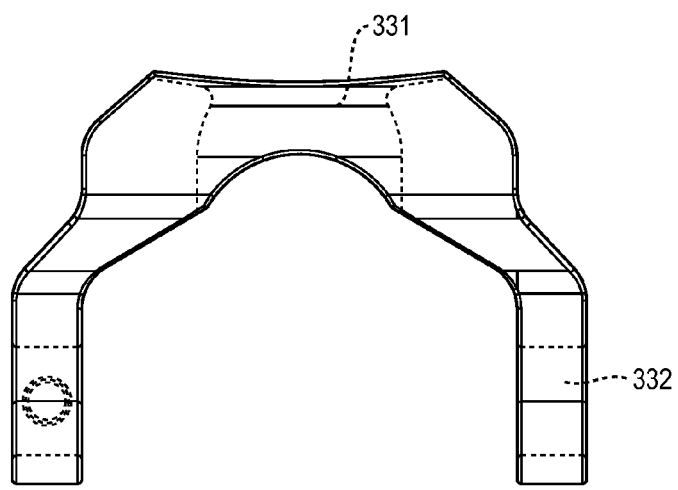
FIG. 13C is a top-view of an endcap having a first opening in a first portion and a handle portion opposite the first portion.

FIGS. 13A-13C depict an embodiment of an endcap 330 defining an opening 331 and a handle portion 332 opposing the opening 331. Handle portion 332 includes openings 333 defined by the handle portion for receiving a handle.

Figure 14A:
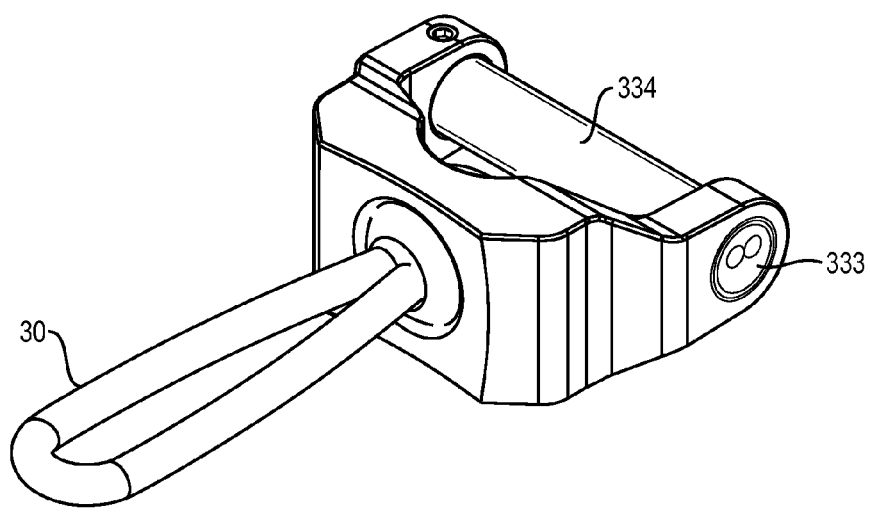
FIG. 14A is a isometric view of a looped connector secured to a detangling connector that is itself housed and secured within a first opening of an endcap that includes a handle portion.
Figure 14B:
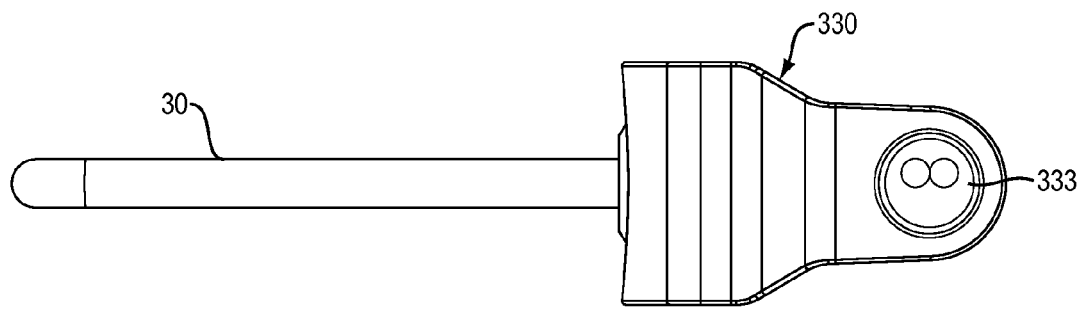
FIG. 14B is a side right-view of a looped connector secured to a detangling connector that is itself housed and secured within a first opening of an endcap.
Figure 14C:
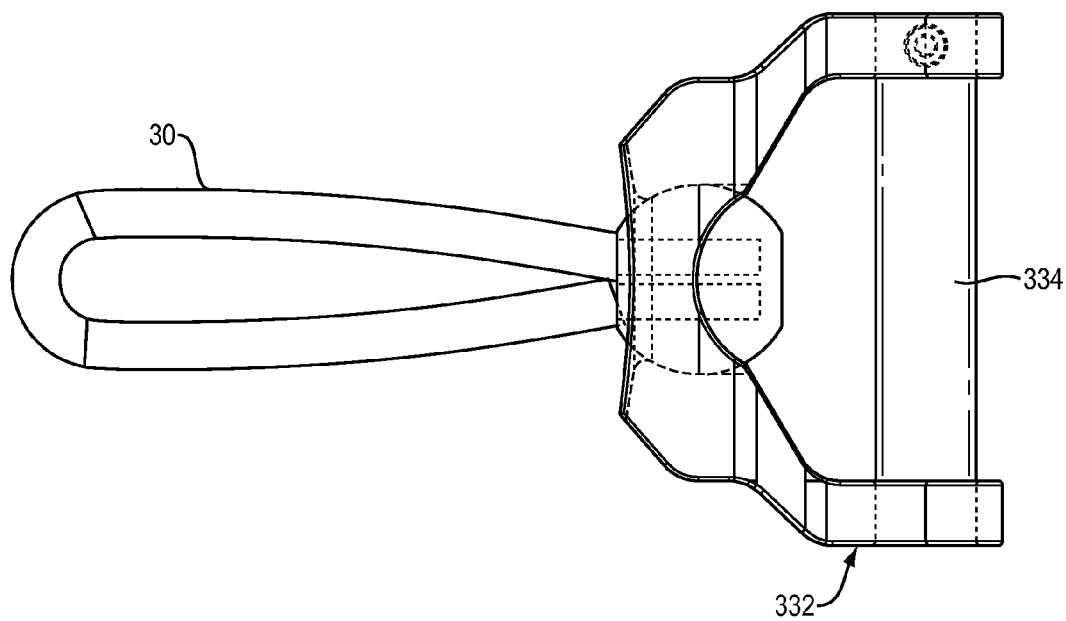
FIG. 14C is a side top-view of a looped connector secured to a detangling connector that is itself housed and secured within a first opening of an endcap.

FIGS. 14A-14C depict the endcap 330 with a handle 334. Endcap 330 comprises any suitable composition and may include aluminum, steel, plastic or any combination thereof. The shape of the endcap 330 may be further varied as desired. Opening 331, in some embodiments comprises a rigid material. In embodiments where the detangling connector is at least partially cylindrical, it is contemplated and included in the present invention that the opening 331 comprises a malleable material. In application, the malleable material may be deformed to allow the detangling connector to swivel axially. In all embodiments, the detangling connector is at least axially and radially swivelable.

Figure 15:
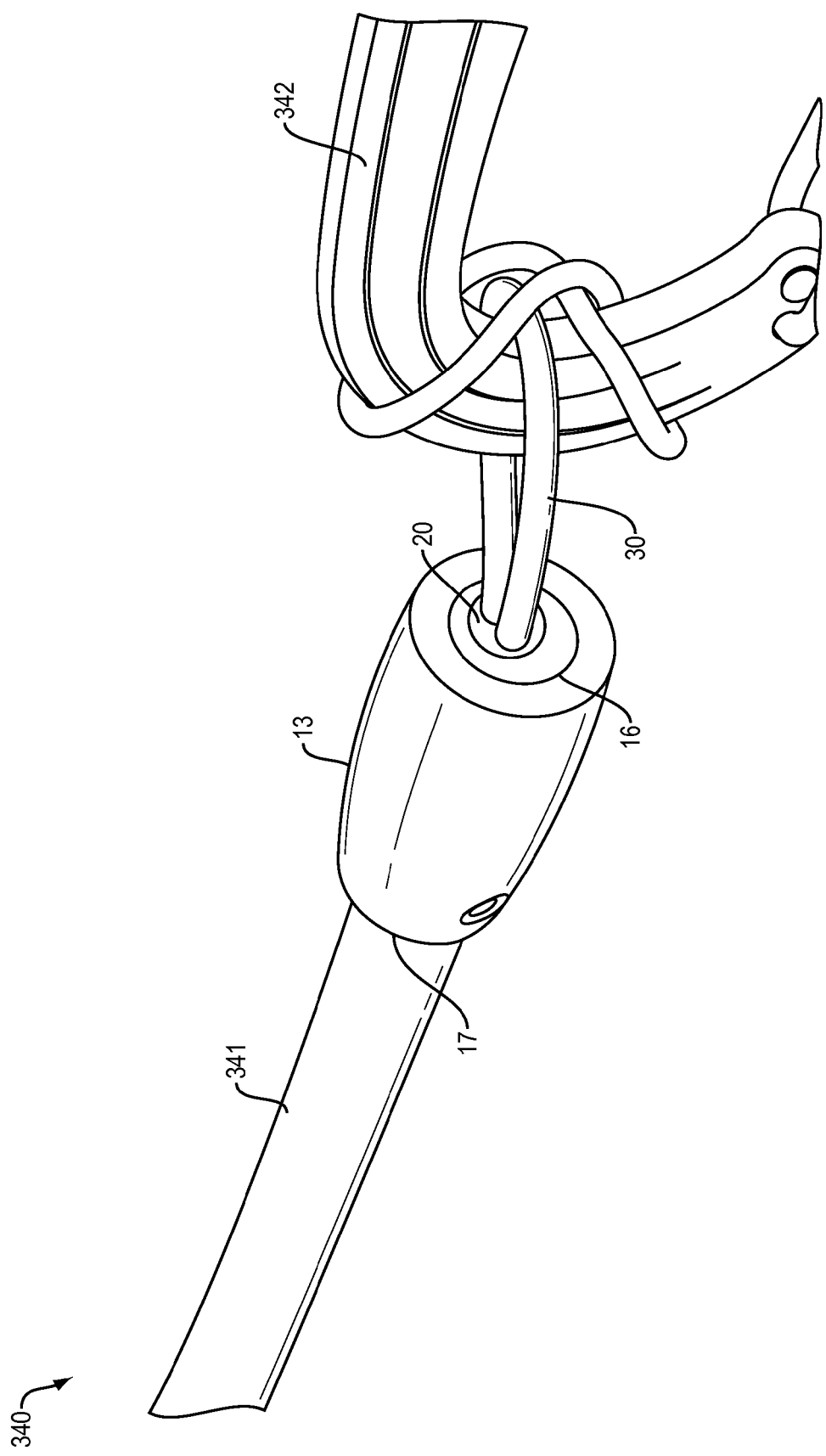
FIG. 15 is an axially and radially swivelable detangling connector device secured at the looped connector end to a carabiner and attached to a leash at the second opening of the endcap.

FIG. 15 depicts an embodiment of an axially and radially swivelable detangling connector device 340 of the present invention. The device includes an entangleable connector 341, an endcap 13, a detangling connector 20 and a looped connector 30. The endcap includes an opening 16 for housing and securing the detangling connector 20 and includes opening 17 for housing and securing an entangleable connector 341. As depicted, the looped connector 30 allows for easy and flexible attachment to various accessories without the need for other application-specific fastening means such as bolts and the like. For example, the looped connector may be easily attached to a carabiner 342 or dog collar or another connector device as presented herein.

Figure 16:
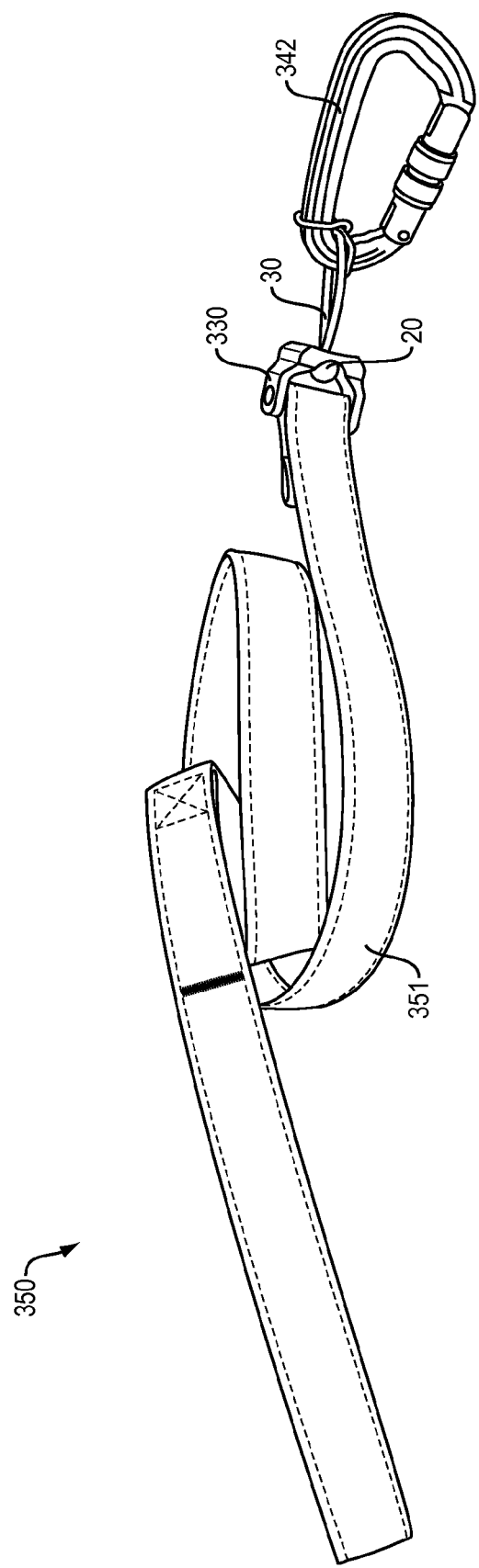
FIG. 16 is an axially and radially swivelable detangling connector device secured at the looped connector end to a carabiner and attached to a leash at the handle portion of the endcap.

FIG. 16 depicts an embodiment of an axially and radially swivelable detangling connector device 350 of the present invention. The device includes an entangleable connector 351, an endcap 330, a detangling connector 20 and a looped connector 30. The endcap includes an opening 331 for housing and securing the detangling connector 20 a handle portion 332 to which an entangleable connector 351 may be attached. As depicted the looped connector 30 allows for easy and flexible attachment to various accessories without the need for other application-specific fastening means such as bolts and the like. For example, the looped connector may be easily attached to a carabiner 342 or dog collar or another connector device as presented herein.

Method of Making

In another aspect of the present invention, methods are provided for making the devices disclosed herein. The present methods include steps for the preparation of axially and radially swivelable connector devices.

In certain embodiments, the method includes provision or formation of a detangling connector, a looped connector, an endcap and formation of an axially and radially swivelable connector device by combining the endcap, the looped connector and the detangling connector.

In preparing an axially and radially swivelable detangling connector device, the steps can include forming openings into the detangling connector such that openings are communicated from a proximal end of the detangling connector towards a distal end such that distal openings in the distal end have a common conduit with the proximal openings in the proximal end. The steps can also include inserting at least two loose ends of a looped connector into the holes in the proximal end. The steps also include applying a fastening means to the detangling connector such that the detangling connector is fastened around the loose ends of the looped connector.

In optional or additional steps, the looped connector connected to the detangling connector is secured to an endcap by housing at least a distal end of the detangling connector in a first opening of the endcap.

In forming the detangling connector, the method can include the step of forming a spherical or cylindrical part. In some embodiments, the detangling connector is a ball joint that is spherical, for example. In other embodiments the detangling connector is a cylindrical part having a flat top and a flat bottom or both and the section between the top and bottom have equal diameter to the top and bottom. In other embodiments, the detangling connector is both cylindrical and spherical in that it comprises a flat top, a flat bottom or both while the section between the top and bottom are spherical and has a diameter that is wider than the diameter at the top or bottom. In other embodiments, the detangling connector is otherwise spherical but includes a flat bottom, a flat top or both. The detangling connector can be formed from aluminum, steel, plastic or any combination thereof. In forming the detangling connector, an injection molding processes can be applied. The mold includes shapes and sizes as desired to form a spherical, cylindrical or combination of shapes.

The mold, in some embodiments further includes shapes for the formation of openings in a distal end, a proximal end or both of the detangling connector. In some embodiments the mold includes shapes for preparing one distal opening in the distal end of the detangling connection and one proximal opening in the proximal end such that a common conduit connects the distal openings in the distal end with the proximal openings in the proximal end. In other embodiments the mold includes shapes such that the number of distal openings in the distal end are less than, greater than or equivalent to the number proximal openings in the proximal end.

In other embodiments, the detangling connector is molded without openings and the desired openings are subsequently drilled into the molded detangling connector. In some embodiments the detangling connector a single distal opening is drilled into the distal end of the detangling connection and one proximal opening is drilled into the proximal end such that a common conduit connects the distal openings in the distal end with the proximal openings in the proximal end. In other embodiments a number of openings are drilled into the molded detangling connector such that the number of distal openings in the distal end are less than, greater than or equivalent to the number proximal openings in the proximal end.

The detangling connector, in some embodiments, is molded to include male and female pin-snaps to secure the detangling connector around looped connector.

The looped connector may be formed from any material which allows the loose ends of the looped connector to be placed within the openings of the detangling connector such that a loop is formed. In other embodiments, the looped connector may be already in a looped shape. In preferred embodiments, the looped connector, is flexible such that it may be easily attached to an accessory. For example the flexibility of the looped connector allows the looped connector to be tied to a subject or object or to an accessory already attached to the subject or object. For instance, the looped connector may be tied to a dog collar, a boat or other mobile objects or subjects.

In other embodiments, the looped connector is rigid and is already in the shape of a loop and includes loose ends that can be housed and secured within the openings of the detangling connector. In heavy duty commercial applications, such an embodiment may be most suitable.

The looped connector is secured to the detangling connector by a fastening means. The fastening means may include reducing the diameter of the openings around the loose ends of the looped connector. In some embodiments, the diameter is reduced by applying a crimping pressure to the detangling connector such that the diameter of the detangling connector or the diameter of the openings are reduced. In other embodiments, the looped connector is secured by applying cable stops to the loose ends of the looped connector and having the diameter of the distal openings in the distal end of the detangling connector larger than the diameter in the proximal end. As such, the loose ends affixed with cable stops have a diameter that is smaller than the diameter of the distal openings in the distal end of the detangling connector but larger than the proximal opening(s) in the proximal end of the detangling connector. This allows the loose ends to be housed within the distal openings of the distal end of the detangling connector but prohibits the loose ends from being pulled through the proximal openings in the proximal end.

The looped connector can be formed of PU coated wire (s), polymers, or any combinations thereof.

The endcap may be formed of aluminum, steel or plastic as desired in view of the intended application. In applications where the subject or object to be controlled is heavy, it may be preferable to use steel or other industrially applicable components in all of the parts of the present invention including the looped connector, the detangling connector and the endcap. In some embodiments, the endcap includes a first opening. In other embodiments, the endcap also includes a second opening or a handle portion that is situated opposite to the first opening. The second opening is formed such that an end portion of an entangleable connector may be housed and secured therein. Entangleable connectors include leases, ropes, chains and wires for example.

The first opening in the first portion of the endcap is fashioned such that it is suitable for housing and securing the detangling connector. In certain embodiments, this first opening includes a spherical or cylindrical space for holding the detangling connector. The detangling connector may be a ball joint. The first opening allows the detangling connector to swivel axially and radially such that any attached entangleable connector will not be entangled, or if entangled will be detangled. The second opening may include a fastening device for securing an entangleable connector. The fastening device or fastening means may be screws, bolts, glue or any combination thereof.

Method of Using

The devices of the present invention are suitable for use in domestic, commercial and industrial applications where a mobile object or subject is to be controlled. In such instances, the present devices can be employed as a connector device between a first object or to be controlled and the a second object or subject that is being used to control the first object or subject. Fore instance in cases where a pet is attached to a leash, the mobile pet will cause the leash to be entangled. The present devices allows the pet and its owner to move about without the leash becoming entangled.

The flexible looped connector can e.g., be connected to a leash and/or tied to the collar of the pet and the second opening of the endcap of the device used to house an end portion of the leash. Movement by the pet or the pet's controller, does not entangle the leash because the leash may swivel axially or radially. In swiveling axially, motion by the pet can swivel the detangling connector housed in the first opening of the endcap. The ability for the detangling connector to swivel both axially and radially prevents the leash from becoming lodged and twisted. In the event that a leash becomes twisted, the entangled leash can be detangled by simply pulling on the leash which will swivel both axially and radially to clear the entanglement.

The present devices may be applied to other domestic or commercial scenarios. It is contemplated that the present devices can be adjusted in size and scope to be applied to boating, shipping, transportation, sailing and other applications.

The invention claimed is:

1. An axially and radially swivelable detangling connector device comprising:
   a spheroidally shaped connector
   two proximal openings defined by a proximal end of the spheroidally shaped connector and extending towards a distal end of the spheroidally shaped connector
   two distal openings defined by a distal end of the spheroidally shaped connector and extending towards the proximal end of the spheroidally shaped connector,
   a common conduit connecting the distal and proximal openings,
   a looped connector having two ends, the two ends being housed and secured within the proximal and distal openings of the spheroidally shaped connector such that a loop is formed adjacent to the proximal end of the spheroidally shaped connector; and
   an endcap comprising
      a first opening for receiving and housing a distal end of the spheroidally shaped connector; and
      a handle or second opening defined by the endcap for receiving and securing an end portion of a leash.

2. A method of preparing an axially and radially swivelable detangling connector device, comprising the steps of:
   providing a spheroidally shaped connector having two distal openings defined by a distal end of the spheroidally shaped connector, two proximal openings defined by a proximal end of the spheroidally shaped connector and a common conduit connecting the proximal and distal openings;
   providing a looped connector having two ends and inserting the two ends of a looped connector into the proximal openings of the spheroidally shaped connector such that a loop is formed adjacent to the proximal end of the spheroidally shaped connector;
   providing an endcap comprising a first opening for receiving and housing a distal end of the spheroidally shaped connector and a handle or second opening defined by the endcap for receiving and securing an end portion of a leash;
   applying fastening means to the spheroidally shaped connector such that the ends of the looped connector are housed and secured within the spheroidally shaped connector; and
   securing and housing the distal end of the spheroidally shaped connector into the first opening of the endcap.

3. The method of claim 2, wherein the fastening means comprises reducing the diameter of the openings defined by the spheroidally shaped connector around the ends of the looped connector.

4. The method of claim 2, wherein the fastening means comprises interlocking male and female pin-snaps for securing the end of the looped connector into the openings defined by the spheroidally shaped connector.

5. The method of claim 2, wherein the spheroidally shaped connector and the openings defined by the spheroidally shaped connector are formed by injection molding.

6. The method of claim 2, wherein the spheroidally shaped connector is formed by injection molding and the openings defined by the spheroidally shaped connector are formed by drilling.

* * * * *